Patented May 14, 1929.

UNITED STATES PATENT OFFICE.

1,713,289

ALFRED LANDUCCI, OF PARIS, FRANCE, ASSIGNOR, BY MESNE ASSIGNMENTS, TO DU PONT-PATHE FILM MANUFACTURING CORPORATION, OF WILMINGTON, DELAWARE, A CORPORATION OF DELAWARE.

PROCESS FOR THE MANUFACTURE OF THREADS, FILAMENTS, BANDS, OR FILMS OF A POLISHED AND TRANSPARENT NATURE, COMPOSED OF PLASTIC SUBSTANCES.

No Drawing. Application filed April 18, 1927, Serial No. 184,834, and in France April 29, 1926.

The present invention relates to an improved process for the manufacture of threads, filaments, bands or films of a polished and transparent nature, from solutions of cellulose derivatives.

It is a known fact that such cellulose derivatives are dissolved in suitable organic solvents and are then converted into transparent or translucent plastic masses of various forms, by the extraction of said solvents by evaporation, or by precipitation or coagulation by oils.

It is further known that the cellulose derivatives, such as esters or ethers are precipitated by water, but in this case opaque plastic masses are obtained.

The present invention relates to a process for the manufacture of threads, filaments, bands or films of a polished and transparent nature from cellulose derivatives such as esters or ethers, which are dissolved in suitable organic solvents, which is characterized in that the solution is coagulated in an aqueous bath when discharged from the apparatus such as nozzles or dies by which the solution is given a suitable form as required for the manufacture, and further, in that the resulting products are made polished and transparent, without change of form, by a hot air drying which is preferably effected immediately after the coagulation takes place.

I have found that when the coagulation is followed by a prolonged drying by hot air at a suitable temperature which in practice may be between 40 and 80 degrees C., a re-polishing effect will take place which is the same as the one obtained by means of solvents or vapours of solvents as specified in my copending application No. 86,928 of the 8th of February 1926. In this event it is not necessary to employ outside solvents, since the re-polishing is performed by the solvents which are still contained in the products from the coagulation process, and the heat starts the action of such solvents. In fact, when issuing from the coagulation apparatus, the products contain a large proportion of solvents, and if at this time the said products are strongly heated, the discharge of the solvents contained in the said products will take place through the material and will dissolve the opaque surface layers in a manner analogous to the dissolving action of new solvents or their vaporus, and the said products will thus become transparent.

This new process has the advantage of permitting a very rapid and inexpensive manufacture, and a complete and ready recovery of the solvents, and I can readily obtain products possessing remarkable qualities of transparency, brilliancy, flexibility and strength.

A great variety of organic solvents may be employed for dissolving the cellulose derivatives, and it is simply necessary that they shall be soluble in or miscible with the aqueous coagulating bath.

For the said aqueous bath we may employ water or suitable aqueous solutions such as aqueous solutions of alcohols or of solvents for the cellulose derivatives, or solutions of salts, such as sodium or calcium chloride, sodium nitrate or the like.

After the precipitation has taken place, the coagulating aqueous bath will contain almost the whole of the organic solvents which served to dissolve the cellulose derivatives and which may be recovered by known means.

The presence of substances conferring plasticity or of loading material in the solutions of the cellulose derivatives will make no change in the application of the present process, nor will the latter be affected by the methods and apparatus used for pouring the solutions of the cellulose derivatives into the coagulating aqueous baths.

It may however happen in certain cases, for instance when the collodions contain a large amount of water, that the product will not be made entirely transparent by this drying, but even in this case the result obtained will be quite appreciable. In this event, I may obtain a perfect transparency and polish by subjecting the product, after drying in a chamber, to the regulated action of proper solvents which act in the state of liquid or vapor, as specified in my aforesaid copending patent application No. 86,928 of the 8th of February 1926.

In conformity to the present invention, and by way of example, the operation may be performed as follows:

*Example 1.*—An acetone solution of nitrocellulose or acetate of cellulose is discharged from a small orifice and is then in immediate contact with very cold water at 4 to 10 degrees C., for example. The precipitation is complete after 1 or 2 minutes, according to the diameter of the stream. The resulting opaque filament is dried in hot air in a chamber which is maintained at 40–80 degrees C. The opacity disappears, and this affords a filament whose brilliancy, flexibility and strength are quite remarkable.

*Example 2.*—A solution of nitro-cellulose in an alcohol-acetone solvent is poured in a continuous sheet upon a well-polished wheel which is partially immersed in a vessel of water. When it makes contact with this water, which is constantly renewed, the nitro-cellulose solution is precipitated. The resulting film is stripped from its support, and is placed in a hot air drying chamber which is maintained at 40–80 degrees C., so that the water will be evaporated, and the film becomes quite transparent.

*Example 3.*—In a modification of the latter example, the sheet of nitro-cellulose collodion is poured directly into a vessel of water in which the sheet becomes solid; the resulting film is seized and drawn forward by rollers disposed on the bottom of the said vessel. The other operations may be the same as indicated in Example 2.

Having now described my invention, what I claim as new and desire to secure by Letters Patent is:

1. Process for manufacturing articles of plastic material which consists in dissolving a cellulose dirivative in an organic solvent, giving to the said solution the desired shape, coagulating the said solution in an aqueous bath whereby a more or less opaque product is obtained and subjecting the product prior to any other treatment thereof to a hot air drying for a sufficiently long time to make said product transparent and polished.

2. Process for manufacturing articles of plastic material which consists in dissolving a cellulose derivative in an organic solvent, giving to the said solution the desired shape, coagulating the said solution in an aqueous bath whereby a more or less opaque product is obtained, and subjecting the product prior to any other treatment thereof to a hot air drying at a temperature comprised between 40 and 80° C., for a sufficiently long time to make said product transparent and polished.

3. Process for manufacturing articles of plastic material which consists in dissolving a cellulose derivative in an organic solvent, giving to the said solution the desired shape, coagulating the said solution in an aqueous bath with which said organic solvent is miscible, whereby a more or less opaque product is obtained, and subjecting the product prior to any other treatment thereof to a hot air drying for a sufficiently long time to make said product transparent and polished.

4. Process for manufacturing articles of plastic material which consists in dissolving a cellulose derivative in an organic solvent, giving to the said solution the desired shape, coagulating the said solution in water whereby a more or less opaque product is obtained, and subjecting the product prior to any other treatment thereof to a hot air drying for a sufficiently long time to make said product transparent and polished.

5. Process for manufacturing articles of plastic material which consists in dissolving a cellulose derivative in acetone, giving to the said solution the desired shape, coagulating the said solution in an aqueous bath, whereby a more or less opaque product is obtained, and subjecting the product prior to any other treatment thereof to a hot air drying for a sufficiently long time to make said product transparent and polished.

In testimony whereof I have signed my name to this specification.

ALFRED LANDUCCI.